United States Patent
Roulliard

(10) Patent No.: US 7,334,574 B1
(45) Date of Patent: Feb. 26, 2008

(54) METHOD AND APPARATUS FOR INCREASED AUTOMOBILE FUEL EFFICIENCY

(76) Inventor: Mark Roulliard, 221 Randall Lake Rd., Parsonfield, ME (US) 04047

( * ) Notice: Subject to any disclaimer, the term of this patent is extended or adjusted under 35 U.S.C. 154(b) by 0 days.

(21) Appl. No.: 11/728,307

(22) Filed: Mar. 26, 2007

(51) Int. Cl.
*F02B 25/00* (2006.01)
*F02M 25/06* (2006.01)

(52) U.S. Cl. ...................... 123/572; 123/574
(58) Field of Classification Search ................ 123/572, 123/573, 574
See application file for complete search history.

(56) References Cited

U.S. PATENT DOCUMENTS

| | | | |
|---|---|---|---|
| 5,072,713 A | * | 12/1991 | Sweeten ...................... 123/573 |
| 5,113,836 A | * | 5/1992 | Sweeten ...................... 123/573 |
| 5,450,835 A | * | 9/1995 | Wagner ...................... 123/573 |
| 5,586,996 A | * | 12/1996 | Manookian, Jr. ............. 55/321 |
| 6,152,120 A | * | 11/2000 | Julazadeh ................... 123/572 |
| 6,994,078 B2 | * | 2/2006 | Roberts et al. ............. 123/572 |

FOREIGN PATENT DOCUMENTS

WO    WO 96/21101    * 7/1996

* cited by examiner

*Primary Examiner*—Hai Huynh

(57) ABSTRACT

An automobile fuel/oil separator including a plurality of gravel particles arranged between a pair of screens is connected with an automobile PCV valve for separating the crankcase oil from the fuel. Evaporative fuel from the fuel tank along with the separated fuel is fed to the fuel carburetor or fuel injector and the separated oil is returned to the oil reservoir.

11 Claims, 2 Drawing Sheets

METHOD AND APPARATUS FOR INCREASED AUTOMOBILE FUEL EFFICIENCY

BACKGROUND OF THE INVENTION

Automobile crankcase emissions reduction devices are arranged between the automobile crankcase and the automobile positive crankcase ventilation valve, hereafter "PCV" to remove some of the engine oil from the fuel before returning the fuel to the engine.

U.S. Pat. No. 4,370,971 entitled "Apparatus for Removing Contaminants from Crankcase Emissions" is an early arrangement for removing engine oil from the mixture by employing filters and fiber particles to enhance the separation process.

U.S. Pat. No. 6,994,078 also entitled "Apparatus for Removing Contaminants form Crankcase Emissions" further describes the use of a deflector designed to change the direction of the liquid and to direct part of the liquid into a containment portion of the vessel and direct the fuel stream to the outlet.

When the apparatus becomes filled with the oil that is separated from the fuel/oil mixture, the container that receives the separated oil must be removed to dispose of the separated oil.

It would be advantageous, in automobile diesel applications, to be able to return the oil to the oil reservoir in the automobile system without having to remove the container from the apparatus, per se.

One purpose of the invention is to describe an efficient arrangement for removing oil from the oil-fuel mix in an automobile PCV system without having to remove the separated oil on a continuing basis.

A further purpose of the invention is to reduce the amount of fuel loss due to thermal evaporation from the fuel reservoir, in combination with the removal of the oil from the fuel-oil crankcase effluent.

SUMMARY OF THE INVENTION

The invention consists of an automobile fuel/oil separator that is connected with an automobile PCV valve, crankcase, fuel breather line and oil reservoir for separating the crankcase oil from the fuel, collecting evaporative fuel for returning the separated fuel and evaporative fuel to the fuel carburetor or fuel injector and returning the separated oil to the oil reservoir. The fuel/oil separator includes a pair of filters within a tube that contains a plurality of fine gravel particles and terminates at one end via an oil deflector plate.

DESCRIPTION OF THE PREFERRED EMBODIMENT

Figure 1:
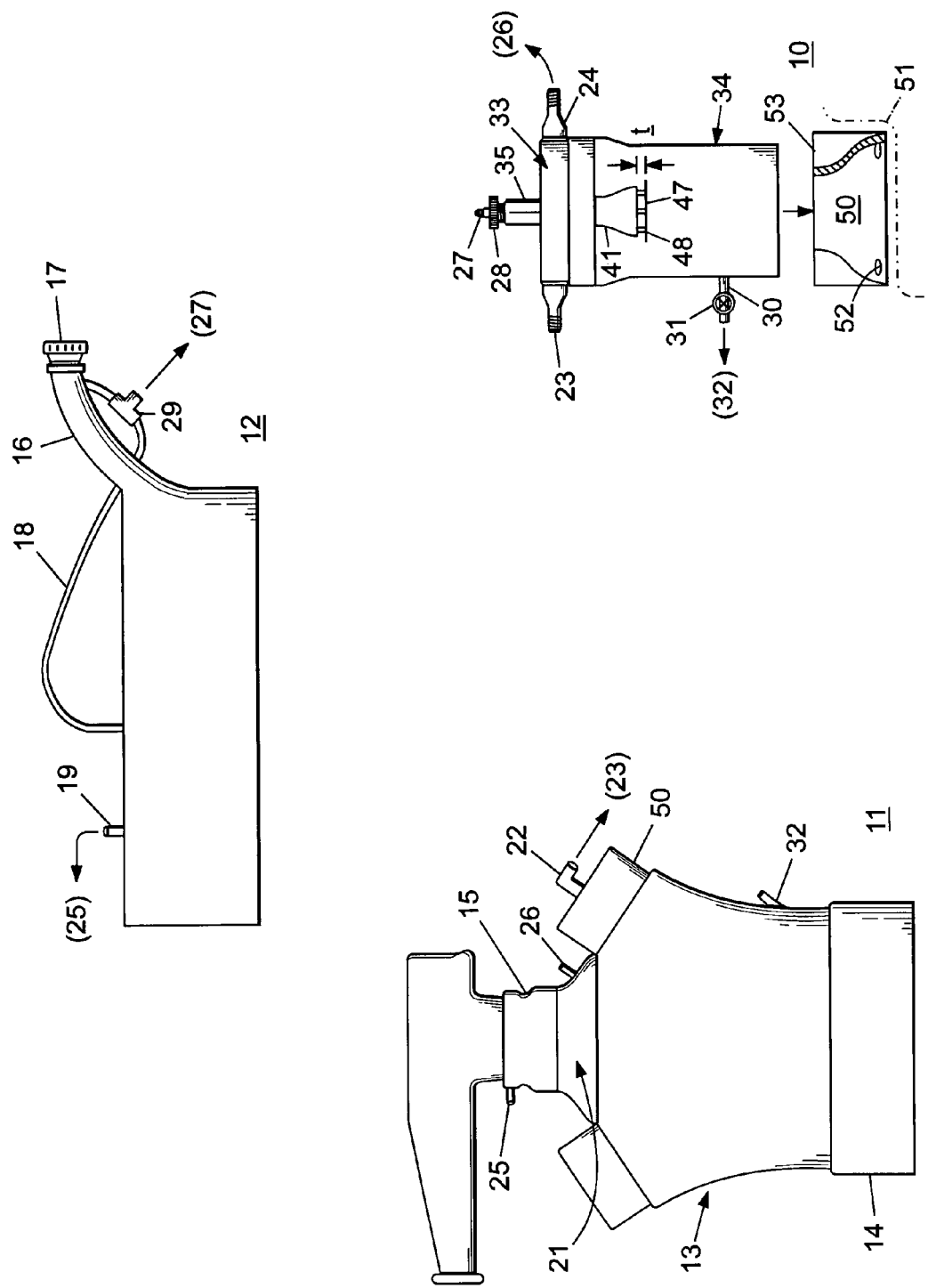
FIG. 1 is a schematic side view depicting the arrangement of the fuel/oil separator of the invention intermediate the automobile engine crankcase and fuel tank.

The fuel/oil separator unit 10, hereafter "f/o separator" according to the invention is depicted in FIG. 1 interconnecting between the automobile crankcase 13 within the automobile engine 11 and the automobile fuel tank 12. For purposes of disclosure the term "fuel" can include gasoline, alcohol, vegetable oil, diesel fuel as well as mixtures thereof, and the term "oil" includes lubricating oil. The crankcase 13 is similar to that described within aforementioned U.S. Pat. No. 6,994,078 wherein the carburetor unit 15 is operatively attached to the top of the crankcase 13 and includes a fuel intake port 25.

The automobile oil reservoir tank 14 constitutes the bottom of the crankcase 13 for replenishing lubrication to the lower engine components (not shown) contained within the crankcase.

The positive crankcase ventilation valve 22, hereafter "PCV" valve extending from the top of the valve cover 50 connects with the f/o separator inlet 23 for separating the oil from the f/o mix in the manner to be described below. Once the oil is separated therefrom, the fuel is returned to the inlet manifold 21 via inlet 26 as indicated. Although a fuel carburetor is described herein, the f/o separator unit 10 also performs as well with a fuel injector system.

The primary fuel source to the fuel carburetor 15 is supplied from the fuel tank 12 via the outlet 19 on the fuel tank and the inlet 25 on the fuel carburetor 15.

The invention differs from the prior art of record by the provision of a breather tube outlet 29 on the breather tube 18 connecting between the fuel tank 12 and the fuel tank accessible cover 17 at the end of the filler pipe 16, as indicated. The outlet 29 connects with the inlet 27 extending from the top of the f/o separator 10 for providing intake air thru the fuel tank cover 17 to the f/o separator 10. Since the fuel tank cover includes an opening (not shown) to prevent the occurrence of vacuum within the fuel tank during operation, it has been determined that some fuel can escape from the fuel tank by evaporation under hot ambient temperature conditions. The connection between the outlet 29 and inlet 27 includes the evaporated fuel along with the intake air provided to the f/o separator 10 and returns the evaporated fuel to the fuel intake manifold 21 via outlet 24 on the f/o separator and the inlet 26 for additional fuel efficiency.

An adjustable valve 28 intermediate the inlet 27 and the threaded tube 35 connecting with the f/o separator 10 allows the intake air to be adjusted for optimum transfer between the f/o separator and the fuel inlet 26.

As noted within the aforementioned U.S. Pat. No. 4,370,971, the f/o separator container 34 is removed from the f/o filter 33 when the separated oil (not shown) reaches a predetermined level to prevent blocking of the filter.

An added feature of the instant invention is the provision of an outlet 30 and valve 31 proximate the bottom of the container 34 which outlet connects with the inlet 32 on the oil reservoir 14 at the bottom of the crankcase 13. When used with gasoline engines, such as described within the prior art of record, the valve is turned off to allow the separated oil to remain within the container 34 for disposal by removal of the container.

When the f/o separator 10 of the invention is used with a diesel engine, it has been determined that the recovered oil within the container 34 is reusable within the crankcase 13, such that the valve 31 is turned on to allow continuous flow of the recovered oil to the oil reservoir 14, via inlet 32, without having to empty the container 34.

A further feature of the invention is the provision of a retainer sleeve 50 attached to the automobile chassis 51, as indicated in phantom, under the automobile hood (not shown) by means of screws 52. The sleeve is fabricated out of plastic, silicone or hard rubber and the opening 53 is sized to receive the bottom of the container 34 in press-fit relation.

Figure 2:
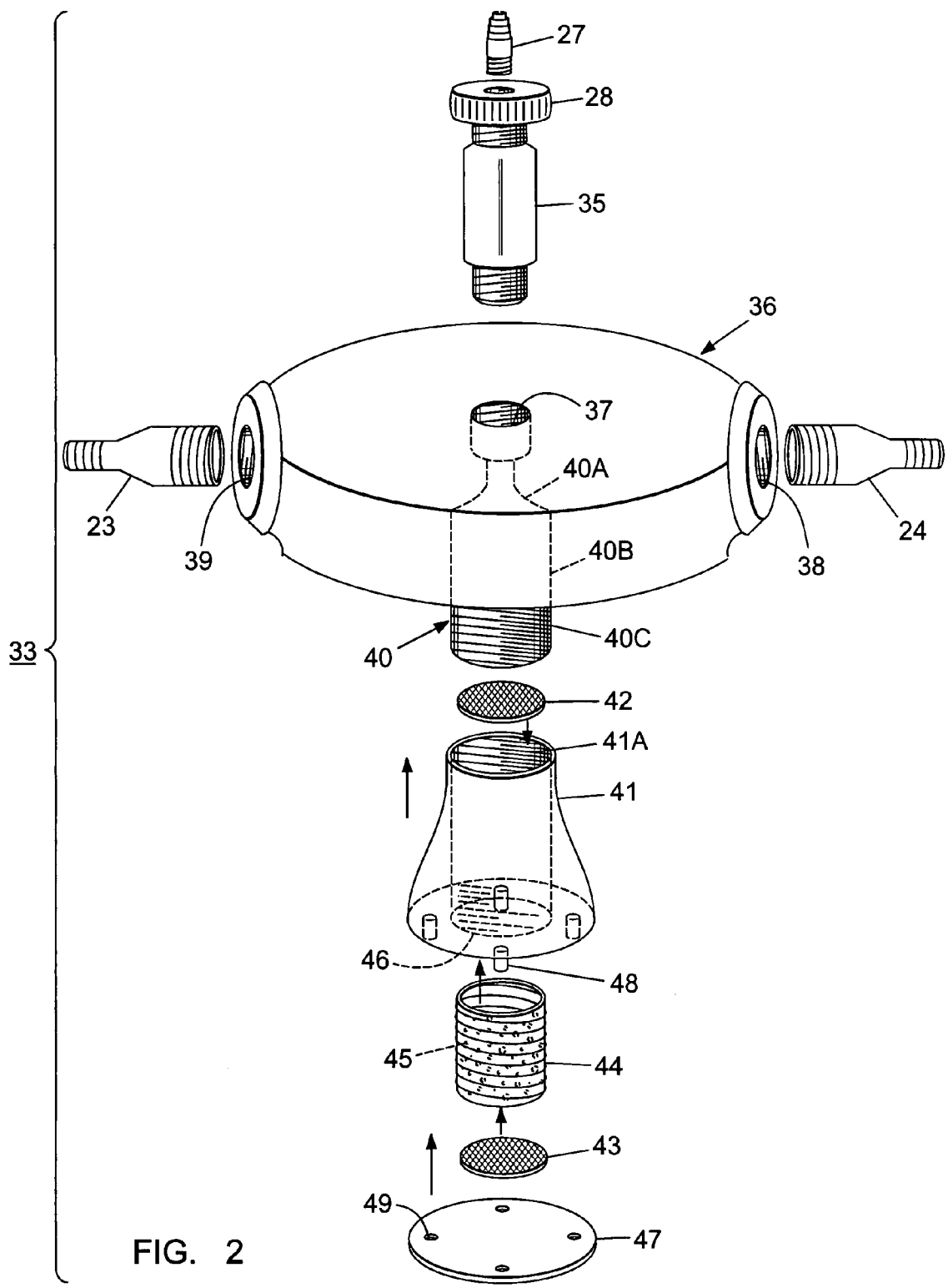
FIG. 2 is an enlarged front perspective view of the components of the fuel/oil separator of the invention in isometric projection prior to assembly thereof.

The components of the f/o separator filter 33 are best seen by referring now to FIG. 1 as well as FIG. 2 wherein the cover 36 contains a central threaded opening 37 for receiving the threaded tube 35 with the inlet 27 and valve 28 attached thereto.

A first threaded side opening 38 is arranged on one side of the cover 36 for receiving the outlet 24 and a second threaded opening 39 is arranged on an opposite side of the cover for receiving the inlet 23.

An elongated tube 40, having a tapered exterior threaded end 40 A for connecting with the threaded opening 37 proximate the tube 35, and an extended larger section 40B is arranged for connecting with a tapered tube 41 via an opposite exterior threaded end 40C on tube 40 and interior threads 41A on tube 40.

Prior to interconnecting the tubes 40, 41, a first screen 42 is inserted within the end of tube 41 for purposes to be described below. A second screen 43 is inserted within an opposite end of a perforated pipe nipple 44 containing a plurality of fine gravel particles as indicated at 45. The pipe nipple 44 is threadingly inserted within the interior threaded elongated tube opening 46 and the splatter plate 47 is coupled to the end of the tube 41 by press-fitting the pins 48, extending from the end of the tube, partially within the openings 49 on the splatter plate.

The provision of an opening t between the plate 47 and the tube 41 via pins 48, as shown in FIG. 1, is an important feature of the invention for the following reasons.

The fuel-oil effluent (not shown) emanating from the PCV valve 22 flows into the f/o separator filter 33 via inlet 23 and the oil (not shown) becomes partially separated upon contact with the first filter 42. The oil becomes further separated from the effluent upon contact with the fine gravel particles 45, in pipe nipple 44, and the second filter 43 before the effluent comes into contact with the plate 47. Upon contact with the plate 47, the oil wets the plate allowing the remaining fuel to flow up to the outlet 24 under the pressure provided by the incoming effluent flow, back to the fuel intake inlet 26, for operation therein. If the plate is set too close to the end of the tube, the oil could remain within the effluent. If the plate is set too far away from the end of the tube, the effluent could by-pass a part of the plate for less efficient oil removal therefrom.

An efficient filtration device for separating oil from a fuel/oil mixture emanating from an automobile crankcase has herein been described.

The device of the invention is capable of preventing the evaporation loss of fuel from the fuel tank as well as returning separated oil to the crankcase without having to remove the oil from the filtration device, per se.

What is claimed is:

1. A separator for separating oil from fuel in a fuel/oil mix from an automobile crankcase comprising:

a filter arranged for connection with an automobile PCV valve connecting with an automobile crankcase, said filter including a pair of screens separated by a plurality of particles and arranged for receiving a fuel/oil mixture from said PCV valve and returning fuel separated from said fuel/oil mixture to an automobile carburetor or fuel injector; and a splatter plate arranged at one end of said filter for receiving oil separated from said fuel/oil mixture and allowing said separated oil to collect at a bottom of an enclosure, said enclosure being removably connected with said filter whereby said enclosure is removable from said filter for disposing of said separated oil, said opposite end of said tube includes a plurality of pins extending therefrom and said splatter plate includes a corresponding plurality of openings therein, said openings being arranged for receiving said pins to thereby attach said splatter plate to said tube.

2. The separator of claim 1 wherein said particles comprise gravel.

3. The separator of claim 1 wherein said pair of screens and said particles are contained within a tube, one end of said tube being arranged proximate an inlet connecting with said PCV valve.

4. The separator of claim 3 wherein said splatter plate is attached to an opposite end of said tube for further separation between said oil and said fuel from said fuel/oil mixture.

5. The separator of claim 1 wherein said pins are arranged to provide a predetermined distance between said opposite end of said tube and said splatter plate to allow said separated oil to collect on said splatter plate prior to collection at said enclosure bottom.

6. The separator of claim 1 wherein said enclosure bottom is connected with said automobile crankcase for selectively returning said separated oil to said crankcase.

7. The separator of claim 6 wherein said enclosure bottom is operatively connected with said crankcase via an adjustable valve, whereby said separated oil is retained within said enclosure when said valve is in a closed position and said separated oil is returned to said crankcase when said valve is in an open position.

8. The separator of claim 1 wherein said filter is further arranged for receiving evaporated fuel from an automobile fuel tank and transferring said evaporated fuel to said automobile carburetor or fuel injector.

9. The separator of claim 1 wherein said fuel comprises gasoline, diesel and or alcohol.

10. The separator of claim 1 wherein enclosure is removably retained within a retainer sleeve attached to a part of an automobile chassis.

11. The separator of claim 10 wherein said retainer sleeve is formed from plastic, silicone or rubber.

* * * * *